United States Patent
Kober et al.

(10) Patent No.: US 7,018,223 B2
(45) Date of Patent: Mar. 28, 2006

(54) CONNECTING DEVICE

(75) Inventors: Horst Kober, Weinheim (DE); Ralf Heinrich, Weinheim (DE); Friedel Brink-Spalink, Ludwigshafen (DE); Holger Lettmann, Plettenberg (DE); Maik Frenzel, Ludenscheid (DE); Norbert Andresen, Schwerte (DE); Achim Gruber, Schönau (DE); Jürgen Henke, Viernheim (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 11/049,786

(22) Filed: Feb. 3, 2005

(65) Prior Publication Data

US 2005/0164524 A1 Jul. 28, 2005

Related U.S. Application Data

(63) Continuation of application No. PCT/EP03/08136, filed on Jul. 25, 2003.

(30) Foreign Application Priority Data

Aug. 5, 2002 (DE) ................................ 102 35 862

(51) Int. Cl.
 *H01R 3/00* (2006.01)
(52) U.S. Cl. ......................................... 439/164; 439/38
(58) Field of Classification Search ................ 439/164, 439/15, 38
 See application file for complete search history.

(56) References Cited

U.S. PATENT DOCUMENTS

| 4,978,191 | A | 12/1990 | Hasegawa et al. |
| 5,054,944 | A | 10/1991 | Matsuyama |
| 5,224,871 | A | 7/1993 | Kato |
| 5,310,356 | A | 5/1994 | Obata et al. |
| 6,506,066 | B1 * | 1/2003 | Kuki ............................ 439/164 |
| 6,641,404 | B1 * | 11/2003 | Matsuzaki et al. ............ 439/15 |
| 6,840,787 | B1 * | 1/2005 | Adachi et al. ............... 439/164 |

FOREIGN PATENT DOCUMENTS

| EP | 0 556 779 A | 8/1993 |
| JP | 2001136647 | 5/2001 |
| JP | 20010136647 A | 11/2002 |

* cited by examiner

*Primary Examiner*—Tho D. Ta
(74) *Attorney, Agent, or Firm*—Brooks Kushman P.C.

(57) ABSTRACT

A connecting device includes first and second housing parts which are rotatable relative to one another and are coupled together to define a space therebetween. At least one flexible cable is provided in the space defined by the housing parts. Each cable includes first and second end sections which are configured to be rolled and unrolled in a spiral or helix on associated contact surfaces of the housing parts, respectively. The end sections normally extend in opposite directions from each other circumferentially around the housing parts so that a U-shaped turning area at which cable movement reverses is formed in the space defined by the housing parts. Magnetic areas are arranged on at least one of each cable, the first housing part, and the second housing part to cause the end sections of each cable to removably adhere to the respective contact surfaces of the housing parts.

19 Claims, 2 Drawing Sheets

CONNECTING DEVICE

CROSS-REFERENCE TO RELATED APPLICATIONS

This is a continuation of International Application PCT/EP2003/008136, published in German, with an international filing date of Jul. 25, 2003, which claims priority to DE 102 35 861.1, filed Aug. 5, 2002, which are both hereby incorporated by reference.

BACKGROUND OF THE INVENTION

1. Field of the Invention

The present invention relates to a connecting device having first and second housing parts, which can rotate relative to one another, and between which there is at least one flexible cable element whose first and second end sections can be rolled up or unrolled in a spiral or helix on associated contact surfaces of the first and second housing parts, respectively, and whose middle section has a U-shaped turning area in which the winding direction is reversed, as well as means to control the unrolling of the cable element when the cable element is rolled up and/or unrolled on the contact surfaces as the two housing parts rotate relative to one another.

2. Background Art

Such a connecting device can be used, for example, in a steering device for motor vehicles. There it serves to transfer electric current (especially signal and/or power current) to the steering wheel from a motor vehicle's on-board electronic system, which is fixedly attached to the body, or vice versa. This makes it possible to integrate into the steering wheel electrical or electronic functional elements that are provided on it, such as, e.g., ignition of the gas generator of an airbag unit, a steering wheel heater, an electric switch to activate blinkers, windshield wipers, or a radio, and to supply them with current from the on-board electronic system. Such a device is disclosed by EP 0 556 779 B1, for example. This device includes an outer housing part, which is associated with a subassembly that is stationary with respect to the rotation of the steering wheel, such as, e.g., the steering column cover of the steering device, as well as an inner housing part that is concentric to the outer housing part and that is associated with the steering wheel and can be rotated together with it. The outer and inner housing parts enclose a ring-shaped cavity, which has arranged in it flexible cables for electrical connection of the outer housing part with the inner one. The end sections of these flexible cables are fastened to the stationary and movable housing parts and, when the two housing parts rotate relative to one another, they can be rolled up or unrolled on their inner or outer peripheral surfaces, respectively. In a middle area, the flexible cables have a U-shaped turning area, in which the winding direction of the flexible cable on the one housing part reverses relative to the other housing part. In particular, EP 0 556 779 B1 proposes arranging several U-shaped turning areas which are distributed around the periphery of the inner or outer housing part spaced at equal angular distances from one another. In the area of a U-shaped turning section the radially further inward or radially further outward end sections of adjacent cables are pressed against the corresponding inner or outer contact surface. Thus, in the arrangement proposed in EP 0 556 779 B1, the cables are fixed against their contact surfaces at regular intervals around the entire periphery. The disadvantage of the known arrangement is that, given the number of four connecting cables that is usually used in steering wheel devices, the support places formed by the four turning areas lie so far apart that a loosening of the cables can still occur in the sections lying between them. This causes collisions and friction of adjacent cables among one another, which not only disturbs the unrolling movement, but rather also exposes the cables to even greater wear.

DE 40 04 233 A1 also discloses a connecting device of the type mentioned at the beginning, in which the cables can be rolled up and unrolled horizontally, in contrast to the vertical cable arrangement from EP 556 779 B1. For example, DE 40 04 233 A1 describes an embodiment in which a flat cable is deformed as a whole so that flat sides of its windings lying on top of one another in layers have the shape of a type of helix or a corkscrew and the same central axis. Thus, the windings have the same outside and inside diameters. In another embodiment, the cable has a spiral shape in which several coaxial windings are radially adjacent in one and the same plane, so that the inside and outside diameters of the windings decrease or increase in the radial direction. In both embodiments the housing parts are formed by an inner cylindrical shaft section and a plate-like top flange extending radially outward from the top end of the shaft section and an outer cylindrical section, which is arranged coaxial to the inner shaft section, and a plate-like bottom flange extending radially outward from its bottom end. The contact surfaces for the cable elements are the surfaces of the horizontal flanges that face one another. Between the two plate-like flanges is the U-shaped turning loop where the direction of winding reverses. In particular, it is possible, analogous to EP 556 779 A1, to provide several cables with several U-shaped turning loops distributed around the periphery which are intended to support the cable layers against one another. According to the publication, even this horizontal arrangement can have the problem that parts of the cable moving in opposite directions rub against one another, which destroys them, which is why the use of spacers is proposed in a preferred embodiment.

SUMMARY OF THE INVENTION

The task of the present invention is to further develop a connecting device of the type described above so that it keeps the flexible cables from loosening and thus prevents loosened cable parts from rubbing against one another, and provides a smooth rotational movement.

According to the present invention, the connecting device has first and second housing parts, which can rotate relative to one another, and between which there is at least one flexible cable element whose first and second end sections can be rolled up or unrolled in a spiral or helix on associated contact surfaces of the first and second housing parts, respectively, and whose middle section has a U-shaped turning area in which the winding direction is reversed. A connecting device according to the present invention also has means to control the unrolling of the cable element when it is rolled up or unrolled on the contact surfaces as the two housing parts are rotated relative to one another, with the means for controlled unrolling comprising magnetic and/or magnetizable areas of the cable element and/or the housing parts, which are arranged so that they cause the end sections of the cable element to adhere to the respective contact surfaces in a removable manner. The use of magnetic attraction has the advantage that it can be adjusted in such a way that although the cable sections are securely fixed between the U-shaped turning areas and thus prevented from coming loose, on the other hand it is easy to unroll the cable sections when there is a rotational movement. This ensures a controlled, smooth rotational movement without jerks, and the wear of the cable sections is kept as small as possible.

The solution according to the present invention is technically simple to implement, in contrast, for example to the roller cages that are disclosed in the prior art, e.g., in U.S. Pat. No. 5,224,871, which are arranged in a ring-shaped cavity between an inner and an outer housing part and have the task of pressing the flexible cables against the inner or outer contact surface of the housing parts. The present invention has the other advantage that the magnetic attraction acts not only between the contact surfaces of the housing part and the cable element lying against it, but rather also between cable element sections lying on top of one another in overlapping areas, given suitable arrangement of the magnetic or magnetizable areas.

A cable element as defined by the present invention includes one or more electrical conductors which are surrounded by a sheath. Possibly, but not absolutely necessary, the conductors in the sheath are additionally surrounded by an insulating material. However, a cable element as defined by the present invention also includes one or more optical fibers which are surrounded by a sheath. The description in connection with the electrical conductors applies analogously for optical fibers.

In a preferred embodiment of the present invention the magnetic and/or magnetizable areas of the cable element and/or the housing parts are formed by a sheath consisting, at least in areas, of a magnetic and/or magnetizable material that surrounds the cable element and/or the contact surface on the housing part. Since in this embodiment there is magnetic attraction between the sheaths of cable elements that are adjacent, e.g., lying on top of one another, the cable elements are also securely fixed in the overlapping areas. A cable element described above is characterized by an especially simple structure and is simple and economical to implement.

In another preferred embodiment of the present invention the magnetic and/or magnetizable areas of the cable element and/or the housing parts are formed by a coating of a magnetic and/or magnetizable material applied, at least in areas, to the cable element sheath and/or the contact surface on the housing part. This embodiment has the advantage that interference with the electrical properties of the cable element can be safely excluded, because the cable itself is not changed. In particular, this variant allows the use of any cable elements that are already present without special adaptation.

It is obvious that it is advantageous if the magnetic or magnetizable coating is always symmetrically applied to the cable element, so that the magnetic attraction is balanced in the area of the electrical conductors. In a ribbon cable this means that the coating should be applied to both sides and in the same thickness on each side. Thus, the electrical conductors lie in neutral fibers, which reduces the wear during bending. Moreover, coating on both sides ensures that when the cable element sections are lying on top of one another the magnetic layers on the outside of each one come to lie against one another, which, given suitable geometry of the magnetization, can achieve a high magnetic adherence between the cable element sections.

It is preferable for the magnetic material to be an elastomer or thermoplastic material, which has magnetic particles such as, e.g., SrFe or NdFeB embedded in it. Possible bases for an elastomer material are, e.g., lattices, PU (polyurethane) rubber, NBR (nitrile rubber), ACM (acrylic rubber), silicones and/or FKM (fluoro rubber), and possible bases for a thermoplastic material are PE (polyethylene), PP (polypropylene), PVC (polyvinyl chloride), PET (polyethylene terephthalate), PEN (polyethylene naphthalate), and/or PU (polyurethane).

It is preferable for the cable element to consist of at least one electrical conductor, which is surrounded directly, i.e., without additional insulation, by a sheath made of an elastomer or thermoplastic material that is doped with magnetic particles as described above.

The connecting device according to the present invention is preferably used in a steering device for motor vehicles to transfer electrical current, especially signal and/or power current, to the steering wheel from a motor vehicle's onboard electronic system, which is solidly attached to the body, or vice versa, with a vertical arrangement of such a device being preferred. In this case, the connecting device according to the present invention has essentially circular geometry, with an essentially cylindrical inner contact surface for the cable element on the inner periphery of the outer housing part and, concentric to it, an essentially cylindrical contact surface on the outer periphery of the inner housing part. It is advantageous to provide a plurality of flexible cable elements, as disclosed in EP 0 556 779 B 1, the full contents of whose disclosure are hereby included by reference, with a plurality of U-shaped turning areas being distributed around the periphery of the inner or outer housing part and with it being possible for the flexible cable elements to be rolled up or unrolled one after the other and for them to overlap with one another in the area of their end sections. This embodiment of the present invention has the advantage that, as disclosed in the prior art, the rotation of the steering wheel requires a comparatively short length of the flexible cable element.

However, the connecting device according to the present invention can also have a horizontal arrangement, as in DE 40 04 233 A1, the full contents of whose disclosure are also hereby included by reference. Theoretically possible, however less preferred, are arrangements in which the contact surfaces are not oriented parallel to one another, but rather subtend an angle, for example, 90°.

In contrast to the embodiments described in EP 0 556 779 B1 and DE 40 04 233 A1, the present invention does not require that the U-shaped turning areas be arranged at equal angular distances from one another in order to prevent the cable element sections from coming loose from their respective contact surfaces. According to the present invention there can be any number of U-shaped turning areas, in particular as few as desired, and they be distributed at any distances around the periphery. The magnetic attraction securely guides the cables in any conceivable arrangement, independent of support by the U-shaped turning areas.

According to the present invention it is not absolutely necessary for the housing parts to have magnetic or magnetizable areas. The same effect can also be achieved by the respective contact surface of the housing part having, around its periphery, at least one layer of the flexible cable element which forms a magnetic or magnetizable contact surface for the other cable element sections that can be rolled up on it.

The cable elements to use in the connecting device according to the present invention are not limited with respect to their geometry or the materials, with the exception of the magnetizable or magnetic areas that are necessary. Connecting devices for steering devices for motor vehicles are usually equipped with ribbon cables that are known in the art.

It is advantageous for the magnetic or magnetizable areas of the cable sheath or the magnetic and/or magnetizable layer to have a strip-shaped geometry, in which strip-shaped zones with uniform magnetization extend parallel to the longitudinal extension of the ribbon cable and have the opposite polarity of adjacent strips. This arrangement of the magnetic or magnetizable areas ensures that there is strong magnetic attraction between the cable elements in the overlapping areas, since strips having opposite polarity come to lie above one another.

Although this disclosure describes the connecting device according to the present invention predominantly in its preferred embodiment, which is a connecting device for steering devices for motor vehicles, the present invention is not at all limited to this use. In theory, the connecting device according to the present invention can be used anywhere that two housing parts arranged so that they can rotate relative to one another have to be connected by means of a flexible transmission medium.

BRIEF DESCRIPTION OF THE DRAWINGS

The present invention is described in detail below using the drawings.

The figures are as follows.

DETAILED DESCRIPTION OF THE PREFERRED EMBODIMENTS

The present invention is described below using the device disclosed in EP 556 779 A1, without limitation on its generality. However, it is just as applicable, for example, to the connecting device described in DE 40 04 233 A1, with a horizontal arrangement of cable elements, as well as to any other corresponding connecting device which works in the same way as that mentioned above.

Figure 1:
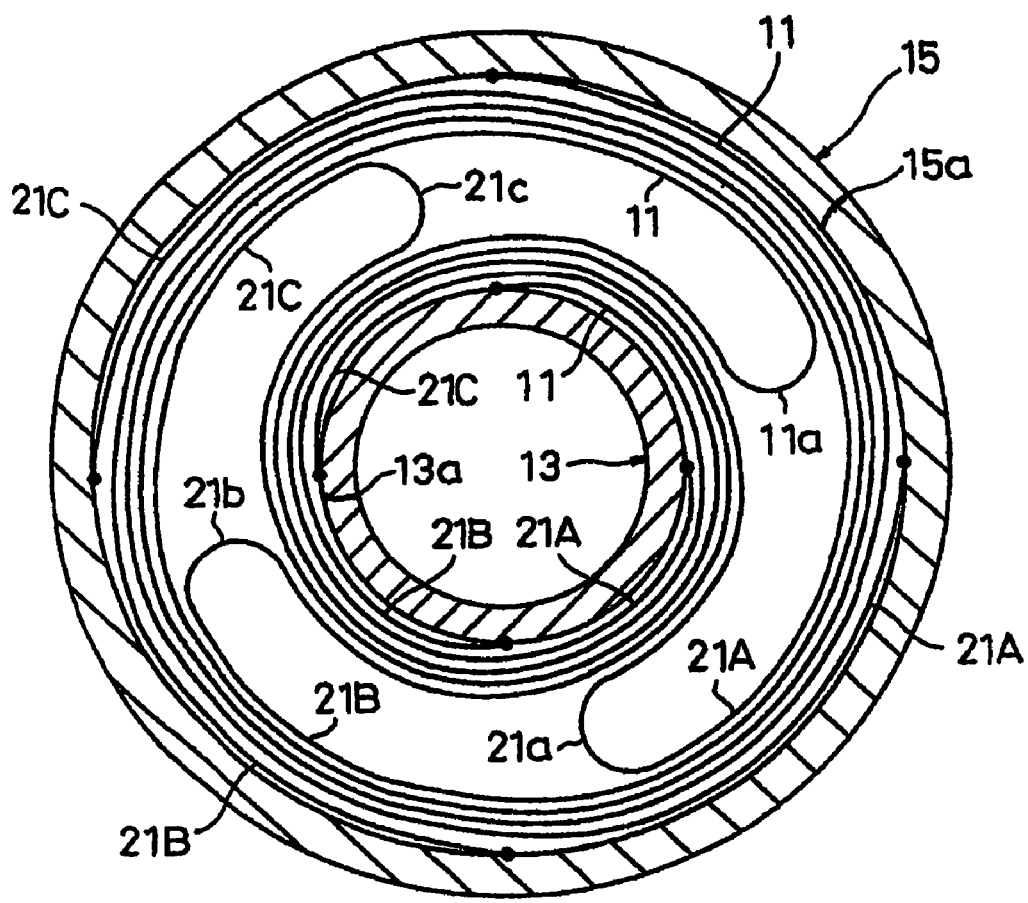
FIG. 1 is a schematic top view of a connecting device for a steering device for motor vehicles with four flexible cable elements, each of which has a U-shaped turning area.

The known connecting device for a steering device for motor vehicles shown in FIG. 1 has an outer housing part 15 with an inner cylindrical contact surface 15a and an inner housing part 13 with an outer cylindrical contact surface 13a. The ring-shaped cavity enclosed by the two housing parts 15, 13 has four flexible ribbon cables 11, 21A, 21B, and 21C arranged in it. The inner end sections of ribbon cables 11, 21A, 21B, and 21C are fastened to the outer cylindrical contact surface 13a, spaced at equal angular distances from one another, and rolled up on it, partially overlapping one another. The outer end sections of the flexible ribbon cable 11, 21A, 21B, and 21C are also fastened to the inner cylindrical contact surface 15a of the outer housing part 15, spaced at equal angular distances from one another, and are also rolled up on it partially overlapping one another. Reference numbers 11a, 21a, 21b, and 21c designate the U-shaped turning areas of the cables 11, 21A, 21B, 21C. At these turning areas 11a, 21a, 21b, 21c, the winding direction of the ribbon cables 11, 21A, 21B, 21C reverses from the inner housing part 13 to the outer housing part 15. It can also be seen in the figure that the four turning areas are arranged at equal distances around the periphery of the inner or outer housing part, and thus at the four equally spaced places they stabilize the cables 11, 21A, 21B, 21C in their position on contact surfaces 13a, 15a. It can also be seen that in the sections between two turning areas the cables cannot reliably be prevented from coming loose in the ring-shaped interior. This disadvantage is eliminated by the present invention. According to the present invention the cables and/or housing parts have magnetic and/or magnetizable areas, which are arranged so that there is magnetic attraction between the cables 11, 21A, 21B, 21C and the contact surfaces 13a, 15a of the inner housing 13 and the outer housing 15, as well as between the cables themselves, which fixes the cables to their contact surfaces in a removable manner. This keeps the cables from coming loose and makes them unroll in a controlled manner when the inner housing 13 rotates relative to the outer housing 15.

Figure 2:
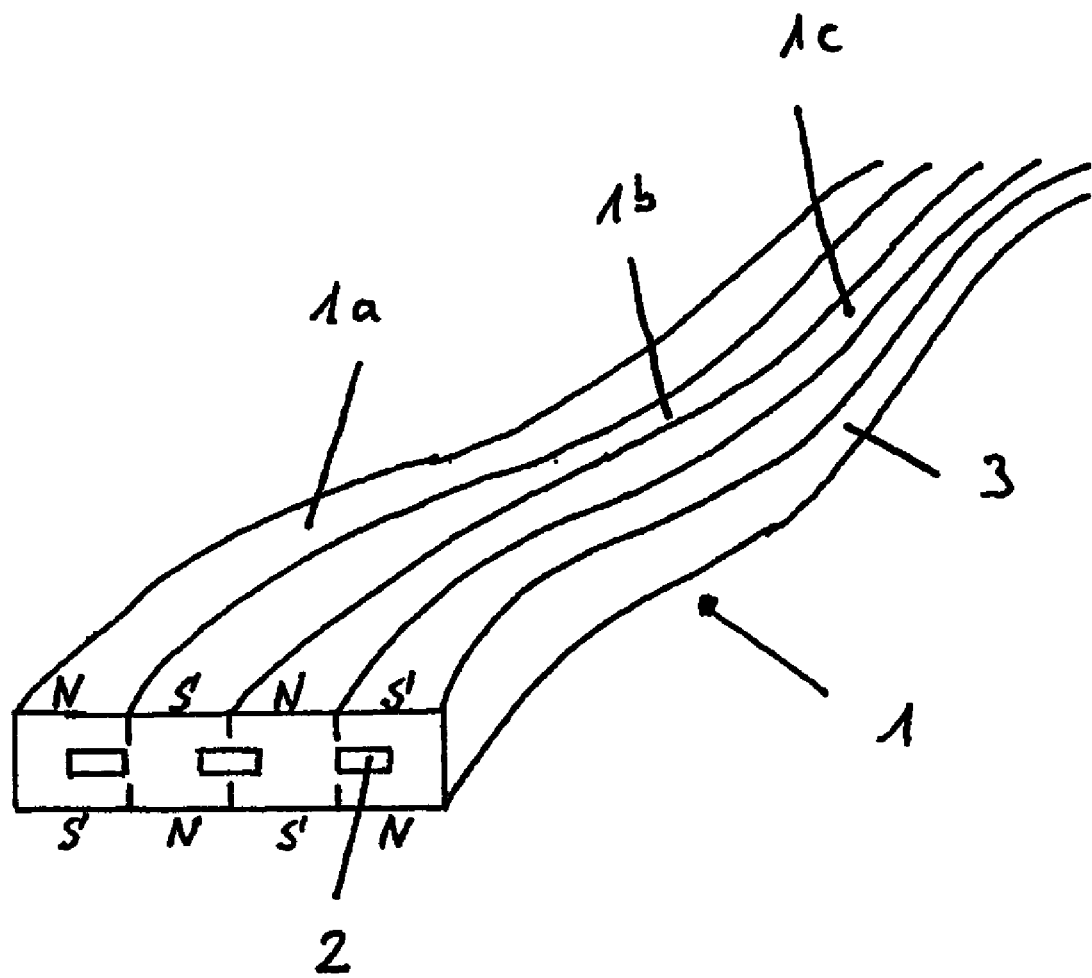
FIG. 2 is a schematic perspective view of a ribbon cable that has a strip-shaped magnetization according to a preferred embodiment of the present invention.

FIG. 2 shows a preferred embodiment of the invention with a ribbon cable 1 that has electric conductors 2 and a sheath 3 and that has a so-called strip magnetization. It can be seen that the magnetic strips 1a, 1b, 1c, etc., extend parallel to the longitudinal extension of the ribbon cable 1, with adjacent strips having opposite polarity. This arrangement ensures that cable elements 1 lying above one another, e.g., in overlapping areas, have strong magnetic attraction between them which prevents uncontrolled loosening.

What is claimed is:

1. A connecting device comprising:

first and second housing parts which are rotatable relative to one another and are coupled together to define a space therebetween;

at least one flexible ribbon cable provided in the space defined by the housing parts;

each cable having first and second end sections which are configured to be rolled and unrolled in a spiral or helix on associated contact surfaces of the housing parts, respectively;

the end sections normally extending in opposite directions from each other circumferentially around the housing parts so that a U-shaped turning area at which cable movement reverses is formed in the space defined by the housing parts; and means for controlling the unrolling of each cable when the cable is rolled up or unrolled on the contact surfaces as the housing parts rotate relative to one another, wherein the means for controlled unrolling include magnetic areas arranged on each cable to cause the end sections of the cable to removably adhere to the respective contact surfaces of the housing parts, wherein the magnetic areas include a sheath of magnetic material surrounding each cable, wherein the sheath of magnetic material surrounding each cable has a strip-shaped geometry in which strip- shaped zones with uniform magnetization extend parallel to the longitudinal extension of the cable and adjacent strips have opposite polarity.

2. A connecting device comprising:

first and second housing parts which are rotatable relative to one another and are coupled together to define a space therebetween;

at least one flexible ribbon cable provided in the space defined by the housing parts;

each cable having first and second end sections which are configured to be rolled and unrolled in a spiral or helix on associated contact surfaces of the housing parts, respectively;

the end sections normally extending in opposite directions from each other circumferentially around the housing parts so that a U-shaped turning area at which cable movement reverses is formed in the space defined by the housing parts; and means for controlling the unrolling of each cable when the cable is rolled up or unrolled on the contact surfaces as the housing parts rotate relative to one another, wherein the means for controlled unrolling include magnetic areas arranged on each cable to cause the end sections of the cable to removably adhere to the respective contact surfaces of the housing parts, wherein the magnetic areas include a magnetic coating applied to each cable, wherein the magnetic coating has a strip-shaped geometry in which strip-shaped zones with uniform magnetization extend paralled to the longitudinal extension of the cable and adjacent strips have opposite polarity.

3. A connecting device comprising:

an inner housing part and an outer housing part which are rotatable relative to one another, and which are coupled together to define a space therebetween for receiving transmission mediums which are spirally wound and housed in the space defined by the housing parts;

a plurality of flexible cables provided in the space defined by the housing parts, each cable being a spirally wound transmission cable serving as a spirally wound transmission medium;

each cable having inner and outer ends fixed to the inner housing part and the outer housing part, respectively;

each cable having inner and outer end sections, the inner and outer end sections normally extending in opposite directions from each other circumferentially around the inner and outer housing parts, so that a direction reversal section at which cable movement reverses is formed in the space defined by the housing parts;

wherein the inner and outer end sections of each cable and the inner and outer housing parts have magnetic areas which cause the end sections of the cable to removably adhere to the inner and outer housing parts with the direction reversal section of the cable being positioned in the space defined by the housing parts.

4. A connecting device comprising:

first and second housing parts which are being rotatable relative to one another;

a flexible ribbon cable between the housing parts, the cable having first and second end sections which can be rolled up or unrolled in a spiral or a helix on associated contact surfaces of the housing parts, respectively;

the cable having a middle section, the middle section having a U-shaped turning area in which winding direction of the cable is reversed;

means for controlling the unrolling of the cable when the cable is rolled up or unrolled on the contact surfaces of the housing parts as the housing parts rotate relative to one another, wherein the means for controlled unrolling include magnetic areas of the cable and the housing parts in which the magnetic areas are arranged to cause the end sections of the cable to removably adhere to the respective contact surfaces of the housing parts, wherein the magnetic area of the cable has a strip-shaped geometry in which strip-shaped zones with uniform magnetization extend paralled to the longitudinal extension of the cable and adjacent strips have opposite polarity.

5. The connecting device of claim 4 wherein:

the at least one flexible ribbon cable includes a plurality of flexible ribbon cables, wherein the U-shaped turning areas of the plurality of cables are distributed around the periphery of the housing parts and the end sections of the plurality of cables overlap one another on the associated contact surfaces of the housing parts.

6. The connecting device of claim 4 wherein:

the magnetic area of the cable includes a sheath of magneti material that surrounds the cable.

7. The connecting device of claim 4 wherein:

the magnetic area of the cable includes magnetic coating applied to the cable.

8. The connecting device of claim 4 wherein:

the magnetic area of a housing part includes a magnetic coating applied to the housing part.

9. A connecting device comprising:

an inner housing part and an outer housing part which are rotatable relative to one another, and which are coupled together to define a space therebetween for receiving transmission mediums which are spirally wound and housed in the space defined by the housing parts;

a plurality of flexible cables provided in the space defined by the housing parts, each cable being a spirally wound transmission cable serving as a spirally wound transmission medium;

each cable having inner and outer ends fixed to the inner housing part and the outer housing part, respectively;

each cable having inner and outer end sections, the inner and outer end sections normally extending in opposite directions from each other circumferentially around the inner and outer housing parts, so that a direction reversal section at which cable movement reverses is formed in the space defined by the housing parts;

wherein the inner and outer end sections of the cables have magnetic areas which cause the end sections of the cables to removably adhere to the inner and outer housing parts with the direction reversal section of the cables being positioned in the space defined by the housing parts.

10. The connecting device of claim 9 wherein:

a magnetic area is arranged on each housing part, wherein each magnetic area arranged on a housing part includes a sheath of magnetic material that surrounds the housing part.

11. The connecting device of claim 9 wherein:

a magnetic area is arranged on each housing part, wherein each magnetic area arranged on a housing part includes a magnetic coating.

12. The connecting device of claim 9 wherein:

a magnetic area is arranged on at least one of the housing parts.

13. The connecting device of claim 9 wherein:

the connecting device is for use in the steering wheel arrangement of a motor vehicle.

14. The connecting device of claim 9 wherein:

each magnetic area is either an elastomer or thermoplastic material having magnetic particles embedded in the material.

15. The connecting device of claim 14 wherein:

the basis for the elastomer material include lattices, PU (polyurethane) rubber, silicones, NBR (nitrile rubber), ACM (acrylic rubber), and FKM (fluoro rubber).

16. The connecting device of claim 14 wherein:

the basis for the thermoplastic material include PE (polyethylene), PP (polypropylene), PVC (polyvinyl chloride), PET (polyethylene terephthalate), PEN (polyethylene naphthalate), and PU (polyurethane).

17. The connecting device of claim 14 wherein:

the magnetic particles comprise SrFe.

18. The connecting device of claim 9 wherein:

the housing parts are concentric.

19. The connecting device of claim 18 wherein:

the first housing part is an outer housing part and has an inner cylindrical contact surface on its inner periphery, wherein the second housing part is an inner housing part and has an outer cylindrical contact surface on its outer periphery for the cable that is arranged concentric to the inner contact surface.

* * * * *

UNITED STATES PATENT AND TRADEMARK OFFICE
CERTIFICATE OF CORRECTION

| | | |
|---|---|---|
| PATENT NO. | : 7,018,223 B2 | Page 1 of 1 |
| APPLICATION NO. | : 11/049786 | |
| DATED | : March 28, 2006 | |
| INVENTOR(S) | : Horst Kober et al. | |

It is certified that error appears in the above-identified patent and that said Letters Patent is hereby corrected as shown below:

<u>Column 7,</u>
Line 62, delete "magneti" and insert -- magnetic --.

Signed and Sealed this

Twenty-seventh Day of June, 2006

JON W. DUDAS
*Director of the United States Patent and Trademark Office*